United States Patent

[11] 3,624,375

[72] Inventor John W. Pross, Jr.
Newfoundland, N.J.

[21] Appl. No. 885,289
[22] Filed Dec. 15, 1969
[45] Patented Nov. 30, 1971
[73] Assignee The Singer Company
New York, N.Y.
Continuation-in-part of application Ser. No. 590,995, Oct. 31, 1966, now abandoned. This application Dec. 15, 1969, Ser. No. 885,289

[54] BINARY CODED DECIMAL TO BINARY CONVERSION APPARATUS
5 Claims, 5 Drawing Figs.

[52] U.S. Cl. .......... 235/155, 340/347 DD
[51] Int. Cl. .......... H03k 13/24
[50] Field of Search .......... 235/154, 155, 169–170; 340/347

[56] References Cited
UNITED STATES PATENTS

| | | | |
|---|---|---|---|
| 2,894,686 | 7/1959 | Holmes .......... | 235/155 |
| 2,929,556 | 3/1960 | Hawkins et al. .......... | 235/155 |
| 3,032,266 | 5/1962 | Couleur .......... | 235/155 |
| 3,185,825 | 5/1965 | McDonald et al. .......... | 235/155 |
| 3,229,078 | 1/1966 | Boland et al. .......... | 235/154 |
| 3,257,547 | 6/1966 | Bernstein .......... | 235/155 |

*Primary Examiner*—Maynard R. Wilbur
*Assistant Examiner*—Charles D. Miller
*Attorneys*—S. A. Giarratana and S. Michael Bender ABSTRACT: A method and means for converting B.C.D. data into pure binary form by utilizing the arithmetic section of a general purpose digital computer. The conversion is based upon the computer's multiply function wherein the binary-coded decimal information is treated as the multiplier and a preselected set of constants are used as multiplicand. That is, a separate constant for each digit to be converted is accessed from memory every four-word times and multiplied serially bit by bit by the four-binary-coded bits representing the decimal character, low order first. If the multiplier bit is a "one," the multiplicand is added and becomes a partial product which, in turn, is stored in the computer's "A" register or accumulator and shifted right one-bit position. If the multiplier bit is a "-zero" the previous partial product in the accumulator is merely shifted. The various constants or multiplicands are weighted so that each successive one is ten-sixteenths as large as its immediately preceding one.

INVENTOR.
JOHN W. PROSS JR.

BY Karl A. Ohralik

ATTORNEY

INVENTOR.
JOHN W. PROSS JR.

BY *Karl A. Ohralik*

ATTORNEY

BINARY CODED DECIMAL TO BINARY CONVERSION APPARATUS

The present case is a continuation-in-part of copending application Ser. No. 590,995, filed Oct. 31, 1966 now abandoned.

BRIEF SUMMARY OF INVENTION

This invention relates to conversion of numbers of one radix or of mixed radices to equivalent numbers of different radix and more particularly to the conversion of number of one radix of mixed radices to numbers of radix 2.

The conversion of decimal numbers to binary equivalents frequently becomes necessary because electronic computers are particularly adapted to handle and precess binary numbers, and data fed into the computer is usually in decimal form. Also, as in the case of navigational computers, input information may be in the form of mixed radices. As an example, locations designated by latitude and longitude may require numbers representing degrees, minutes and seconds, wherein the numbers individually are decimal numbers but are related to one another by the radix 60 since there are 60 seconds per minute and 60 minutes per degree. Various conversion apparatus for converting decimal numbers to equivalent binary numbers have been devised and employed in conjunction with electronic computers. In one form, the conversion apparatus is a separate entity performing the sole function of conversion and to a certain extent adding to the complexity, size and cost of the computer. Alternatively, portions of the compute circuitry may be employed for performing the decimal to binary conversion but, in these case, special, complex programming instructions are required, again adding to the total overall complexity and cost of operation.

In accordance with this invention, the conversion of decimal numbers or mixed radix numbers in binary-coded form to pure binary numbers is carried out with logic circuitry which is also adapted for performing the multiply function of the computer. In the conversion operation, provision is made for treating the binary-coded number as a multiplier and different preselected constants as multiplicands. A first constant in binary form is used as a multiplicand and is multiplied by the four bits of a first binary-coded decimal digit. A second constant is used for the next digit, a third constant for the third digit and so on for each digit in the number to be converted. As partial products are formed they are added to the contents of an accumulator register which is also shifted right one bit following each addition.

In accordance with this invention, the stored constants bear a relation to each other in that each successive constant after the first is ten sixteenths times the last previous constant. Since the succession of constants are used for digits representing progressively higher orders of 10, they must be increased by a factor of 10, but since the number to be converted is shifted right four places for each digit of conversion, increasing it by a factor of 16, the constant must be decreased by the same factor.

Other and further objects and advantages will appear from a more detailed description of the invention taken with the accompanying drawing in which:

FIG. 1 is a block diagram showing a portion of the logic circuitry of a computing system which is effective to perform a binary-coded decimal to binary conversion of fractional numbers as well as performing multiplication of binary numbers in accordance with the invention, FIG. 2 is a fragmentary view of a portion of a magnetic storage disk forming the memory of a computer and containing on one track thereof the constants used as "multipliers" for performing a binary-coded decimal to binary conversion, and FIGS, 3 4 and 5 show different portions of FIG. 1 which are operative at different times in performing a conversion.

In accordance with the present invention the B.C.D. to binary conversion is carried out with the use of an operand for each decimal digit. If $c_i$ represents the decimal characters ($C_1$ being the least significant, and $0 \leq C_i \leq 9$) and $K_i$ the operands, and $N$ digits are to be converted; then the result of the operation will be:

$$2^{-4}\sum_{i=1}^{N} C_i K_i 2^{-4(N-i)} \qquad (1)$$

where $-1 \leq K_i \leq 1$. The constants $K_i$ are selected to provide the proper conversion and may include any required scale factors. The result must be shifted left four-bit positions to obtain the final answer.

As can be seen from equation 1, each $K_i$ is equal to $2^{-4}(N-i)$ times the weight of the $i$th decimal character, hence, additional scaling may be required. The following examples illustrate the selection of $K_i$:

EXAMPLE 1

A seven-digit decimal fraction is to be converted to an equivalent pure binary fraction.

Here, $N$ equals 7 and the weight of each decimal digit $C_i$ is $10^{i-8}$. Then $$K_i = 10^{1-8} 2^{4(7-i)}$$

but these values cannot be used, since $K_1$ and $K_2$ would exceed unity. Therefore we take:

$$K_i = 10^{i-8} 2^{4(6-i)}$$

which includes an additional scale factor of 2. The result of the operation must be shifted left five-bit positions (four as indicated previously plus one for the additional scale factor). The resulting values of $K_i$ are shown in the following table.

TABLE I

| OPERAND | OPERAND VALUE |
|---|---|
| $K_1$ | 0.8388608 |
| $K_2$ | 0.524288 |
| $K_3$ | 0.32768 |
| $K_4$ | 0.2048 |
| $K_5$ | 0.128 |
| $K_6$ | 0.08 |
| $K_7$ | 0.05 |

EXAMPLE 2

An angle expressed in degrees, minutes, and seconds (e.g., 129°, 48 min. 35 sec.) is to be converted to a binary number scaled so that 1 corresponds to 360°. The weights of the decimal characters are shown below in table II. An additional scale factor of 360° must also be included. If $K_i$ is chosen to equal $2^{(n-i)}$ times the character weight divided by 360, some of the $K_1$ will exceed unity; thus, an additional scaling of $2^4$ is required. Table II shows the resulting values of $K_i$. The result of this operation must be shifted left eight positions to obtain the final result.

TABLE II

| | Weight | Operand value |
|---|---|---|
| Character: | | |
| $C_1$ | $\frac{1°}{60^2}$ | $K_1=\frac{1}{60^2}\times\frac{1}{360}\times 2^{-4}\times 2^{24}=0.809086419$ |
| $C_2$ | $\frac{10°}{60^2}$ | $K_2=\frac{10}{60^2}\times\frac{1}{360}\times 2^{-4}\times 2^{20}=0.505679012$ |
| $C_3$ | $\frac{1°}{60}$ | $K_3=\frac{1}{60}\times\frac{1}{360}\times 2^{-4}\times 2^{16}=0.189629627$ |
| $C_4$ | $\frac{10°}{60}$ | $K_4=\frac{10}{60}\times\frac{1}{360}\times 2^{-4}\times 2^{12}=0.118518519$ |

–Continued

| | Weight | Operand value |
|---|---|---|
| Character: | | |
| $C_5$ | 1° | $K_5=1\times\frac{1}{360}\times2^{-4}\times2^{8}=0.044444444$ |
| $C_6$ | 10° | $K_6=10\times\frac{1}{360}\times2^{-4}\times2^{4}=0.027777778$ |
| $C_7$ | 100° | $K_7=100\times\frac{1}{360}\times2^{-4}\times2^{0}=0.017361111$ |

It may be observed that the effect of the conversion operation is to multiply the value of each decimal character by a scale factor representing the (scaled) weight of the character, and then to sum the results. As such, the decimal-to-binary operation is substantially similar to a known multiply function carried out in the arithmetic section of a general purpose digital computer except that a new multiplicand (scale factor) is used for each character. The shifting of the partial products are accounted for in the selection of the scale factors, $K_i$, as described above. A new multiplicand is used for each decimal character and additions of this multiplicand to the shifted partial products are controlled by the bits of the corresponding decimal character, as in multiply. And although the novel conversion method of the present invention may be practiced on almost any programmable general purpose digital computer if modified as shown in FIG. 1 of the drawings, it is preferable that a computer to be used which handles and processes data serially by bit and by word, low order first, with say, 32 usable bits per word, for example, the last one of which may be reserved as a sign bit. In addition, it is recommended that all data be scaled to fractional numbers and that negative numbers to represented in 2's complement form. In the data processing let it be assumed that the computer is programmed to operate in several phases, three of which are first word phase, additional word phase and last word phase. The duration of first work phase and last work phase will be considered as one-word time, but additional word phase may last several word times. For example, in the case of a multiply operation, the number of additional word times may be 31, while in a BCD to binary conversion operation, the number of additional work times may be expanded by the program and will depend on the number of BCD digits to be converted.

Therefore, in the computer used to instrument the present invention, the data words may be assumed to contain 31 bits plus a sign bit in the most significant bit position. Negative numbers are represented in the 2's complement form whereby such a negative number has a 1 bit in the most significant bit position. A word time, therefore, is equal to 32-bit times. Bits are presented least significant bit first, and with reference to the drawings, are contained high order on the left and low order on the right in the registers.

As in most general purpose digital computers, the computer used with the present invention should be basically organized around a memory store, and I/O unit, a control unit, and a arithmetic unit. In operation, a prepared set of instructions stored in the computer's memory (i.e., the computer program) will be designed to interact with the control unit in a known manner whereby the latter generates various logic or control signals for governing the operation of the arithmetic unit as preferred and will be further described below. It is to be understood therefore, that the exact program used to obtain the logic signals required in the present invention may be devised by those skilled in the art and may vary depending upon the actual hardware being employed. A particular computer program therefore forms no part of the present invention. Moreover, in the present case, the conversion operation as mentioned above, is based in good part upon the conventional multiply operation of the arithmetic section of the computer; hence, for simplicity of presentation, a detailed description of those parts of a computer not involved in this operation have been omitted herein. Suffice it to say, that only those portions of the computer's arithmetic unit which are essential for a full understanding of the multiply function as it relates to the novel concepts of the present invention are shown in the accompanying drawings.

DETAILED DESCRIPTION OF THE INVENTION

Figure 1:
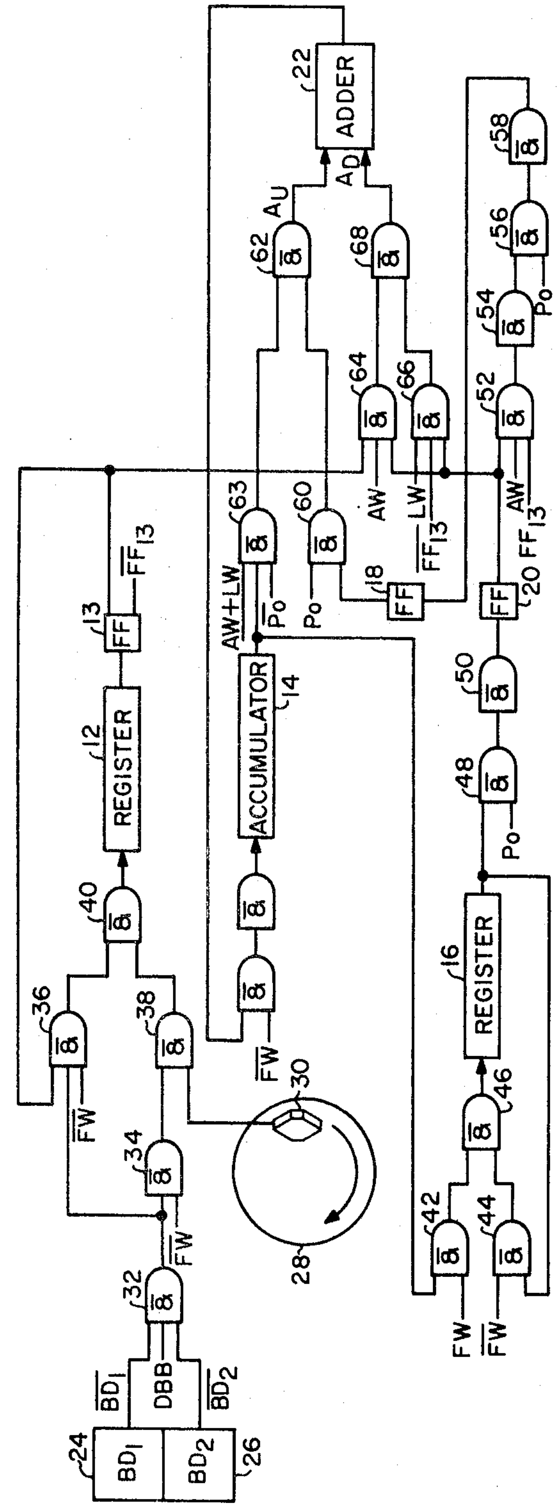

Referring now to the drawing for a detailed description of the invention, in FIG 1, 10 represents generally the arithmetic portion of a computer embodying the features of this invention and including three shift registers 12, 14, and 16. Such registers are so well known in the digital computer art that a detailed description thereof is believed unnecessary herein, the reader's attention being invited, for example, to "High-Speed Computing Devices" published by McGraw-Hill in 1950, page 299. The register 12 has a 31-bit content extended one bit by the flip-flop 13, and these registers have a 31-bit content whereby during each word the contents of the registers is effectively shifted right one place. A pair of further flip-flops 18 and 20 are associated with register 16, the flip-flop 20 forming an effective extension during word times when the contents are right shifted. Thus, as will be more fully explained below, this flip-flop contains the multiplier bit during a multiply or conversion operation.

Each of the flip-flop circuits employed in the computer used to carry out the present invention is capable of assuming either of two states of equilibrium and each has a "true" output and a "false" output. In the set condition of a flip-flop, the true output is a logical "1" and the "false" output is a logical "0" while in the reset condition thereof the "true" and "false" outputs are 1," "0" and "1," respectively. In the cases wherein the "false" output is not necessary for the present explanation, a showing and description thereof is omitted. Also, each flip-flop may have two inputs requiring a coincidence of signals to set or rest the flip-flop. However, for simplicity and brevity of explanation, each is shown with only one input, it being assumed that the flip-flop is set or reset in accordance with the signal impressed on this single line. For a detailed description of such flip-flop circuits reference is made to the aforementioned "High-Speed Computing Device," pages 15 through 17. A further pair of such flip-flops 24 and 26 are interconnected to form a four-step binary counter 29 for counting the four-word times necessary for accessing the conversion constants $K_i$ from memory every four-word times, or stated more specifically, for sequencing the withdrawal of a new constant from the storage disc 28 each four-word times as will be explained. The separate flip-flop stages in counter 29 are designated $BD_1$ and $BD_2$, respectively, the and the counter is responsive to an input pulse for changing its state. Thus, the output logic of each stage may be designated $BD_1$, $\overline{BD_1}$ and $BD_2$, $\overline{BD_2}$, respectively, and the counter may have four distinct states as given, for example, by the following truth table:

TABLE III

| | $BD_1$ | $BD_2$ | |
|---|---|---|---|
| $\overline{BD_1}$ | 0 | 0 | $\overline{BD_2}$ |
| $\overline{BD_1}$ | 0 | 1 | $BD_2$ |
| $BD_1$ | 1 | 1 | $BD_2$ |
| $BD_1$ | 1 | 0 | $\overline{BD_2}$ |
| $\overline{BD_1}$ | 0 | 0 | $\overline{BD_2}$ |

In operation, the four-step counter 29 is incremented by a signal $P_o$ obtained from the computer's control unit and signifying each of the computer's minor cycles or word times. Thus, in the present case where each data word comprises 31 bits plus a sign bit, the $P_o$ signal may be obtained from another binary counter or "bit counter" (not shown) which has six flip-flop stages and 33 distinct states and therefore is a adapted to count down from $P_{32}$, $P_{31}$ etc., to $P_o$. This "bit" counter will be advanced each bit or clock time. Since the four state counter $BD_1$–$BD_2$ is incremented every $P_o$ (i.e., every 33rd clock time) will be reset to its 00 or $\overline{BD_1}\,\overline{BD_2}$ state every fourth word time as indicated in table III. Binary counters of the type described herein are fully disclosed in "High-Speed Computing Devices" on pages 17 through 19.

All other logic circuitry, as shown and described, comprises NAND circuits which and AND-INVERT circuits and, as such, produce at their outputs the complement of the coincidence of the inputs. These NAND circuit may have a plurality of inputs or a single input. In the latter case, the circuit may be regarded simply as an inverter. A NAND circuit suitable for use with the present invention is described in "Digital Computer Fundamentals" published by Prentice-Hall in 1965, on pages 77 and 78 thereof.

Figure 2:
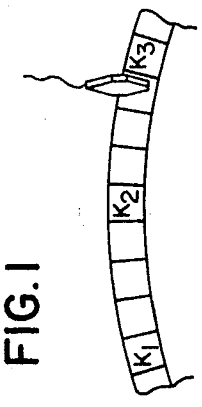

The contents for performing the conversion, as described hereinabove, are stored on a memory disc 28 in pure binary form. Information may be read from the disc by a magnetic read head 30 as the disc is rotated as represented by the arrow shown. The constants are stored on one track on the disc 28, as shown in FIG. 2, and appear each four words. Thus, the first constant $K_1$ is stored in a certain word location and four-word times later is stored constant $K_2$. Subsequent constants are similarly spaced. And although a disc memory is preferred for use with the present invention because of its relative economy it will be understood that other memory systems may be used alternatively as well. For example, the constants $K_i$ could be stored on a preselected track of a rotating magnetic memory drum, it being necessary only that the constants be spaced at four-word intervals thereon. Rotating disc memories and drum memories are described in the "Computer Handbook" published by McGraw-Hill in 1962, on pages 12–31 to 12–34.

As may be understood by those skilled in the art, the memory disc 28 on the memory drum, if one is used instead, will have a clock track having a bit recorded in each position thereof. These bits are used to generate clocking or timing signals for all flip-flops and registers in the computer. The latter's operation proceeds at a rate determined by the rate the bits are read from the clock track, which in turn, is determined by the disc or drum speed.

Initially the binary-coded decimal number to converted is placed in accumulator register 14, and during the first word time of the conversion operation, the first constant $K_1$ from memory is placed into register 12; simultaneously, the contents of the accumulator is transferred to register 16. For introducing the first constant into register 12, the flip-flop circuits 24 and 26 are both initially reset whereby the "false" outputs of these circuits, namely, $\overline{BD_1}$ and $\overline{BD_2}$, are both true. As hereinabove described in connection with table III this condition of these flop-flop circuits represents the beginning of a four-word interval. These outputs of these flip-flop circuits are applied as two of the inputs to a NAND-circuit 32, a third input of which is DBB, a signal which is obtained from the control unit and is true during the entire binary-coded decimal to binary conversion operation. The output of NAND-circuit 32 is applied as one input to a NAND-circuit 36. NAND-circuits 34 and 36 are each provided with a second input to which is applied a signal $\overline{FW}$ which is the complement of a signal which is true or logical 1 during the first word phase (one-word time) of the conversion operation and NAND-circuit 36 has a third input to which is applied the true output terminal of flip-flop 13. The output terminal of NAND-circuit 34 is applied to one input of a NAND-circuit 38, a second input of which is connected to the read head 30 of the memory unit, and the output of this NAND circuit together with the output of NAND-circuit 36 are applied as inputs to a NAND-circuit 40. The output of NAND-circuit 40 is applied to the input end of shift register 12. In Boolean terms, the input of this shift register is $(\overline{BD_1}\cdot\overline{BD_2}\cdot DBB+FW)Gm+(BD_1+BD_2+\overline{DBB})\cdot\overline{FW}\cdot F/F$ 13. This expression indicates that at first word time, or at the beginning of a four-word time, for the beginning of a four-word interval wherein $BD_1$ and $BD_2$ are each false, the contents of memory (Gm) is placed into register 12 and that during times other than first-word time and at a time intermediate to the four-word interval, the contents of this register is recirculated.

During first-word time of the computer, the contents of accumulator register 14, which is the binary-coded decimal number to be converted, is placed into register 16. The output of accumulator register 14 is applied to one input of the NAND-circuit 42, the other input of which has applied to it the signal FW. The output of register 16 is applied as one input to a NAND-circuit 44, the other input of which has applied to it the signal $\overline{FW}$. The outputs of NAND-circuits 42 and 44 are applied to the respective inputs of a NAND-circuit 46, the output of which is applied to the input of register 16. The Boolean expression for the input to register 16 is $(14\cdot FW+(16)\cdot\overline{FW}$ indicating that at first-word time the accumulator contents is entered into register 16 and at other than first-word time, the contents of register 16 is recirculated.

As the contents of accumulator 14 is shifted into register 16, the lease significant bit of the word so shifted is placed into flip-flop 20 to be used as a multiplier bit. To enable this, the output of register 16 is applied to one input of a NAND-circuit 48 having the aforementioned signal $P_o$ designating sign bit time applied to its other input. The output of NAND-circuit 48 is applied to the single input of a NAND-circuit 50 serving as an inverter, the output of which is applied to the input of flip-flop circuit 20. Thus, at sign bit time, the least significant bit of the work in register 16 is shifted into flip-flop 20.

During the additional word times, designated AW, the flip-flop 18 receives the sign of the multiplicand which is placed into the register 12. The true output of flip-flop 20 is applied as one input to a NAND-circuit 52, the other two inputs of which have applied thereto signals AW and F/F 13. The output of this NAND circuit is inverted by a NAND-circuit 54 and applied as one input to a NAND-circuit 56, the other input of which receives a signal $P_o$ which is true at sign bit time. The output of NAND-circuit 56 is inverted by a NAND-circuit 58 and applied to the input of flip-flop circuit 18. Thus, the Boolean expression for the input to flip-flop 18 is $F/F_{20}\cdot F/F_{13}\cdot AW\cdot P_o$. Thus, if the multiplicand contained in register 12 is negative, the flip-flop 13 will be set at $P_o$ and if flip-flop 20 is set indicating a multiplier bit therein, flip-flop 18 will be set.

The augend input of adder 22 receives the sign bit during sign bit time and the contents of accumulator 14 during other bit times. The true output of flip-flop 18 is applied to one input of a NAND-circuit 60, the other input of which receives the signal $P_o$. The output of NAND-circuit 60 is applied to one input of a NAND-circuit 62. Adder 22 may be a conventional serial adder such as that fully disclosed on page 275 of the aforementioned "High-Speed Computing Devices."

The output of accumulator register 14 is applied to one input of a NAND-circuit 64, as well as to NAND-circuit 42, and a second input of NAND-circuit 64 has applied thereto a signal AW+LW indicating a true input during additional or last word times. The output of this NAND circuit forms the other input to NAND-circuit 62, the output of which is applied to the augend input to adder 22. In Boolean terms this input is $(AW+LW)\cdot(P_o\cdot F/F_{18}+\overline{P_o}\cdot$ (14) indicating that after first-word time the sign bit from flip-flop 18 is added at $P_o$ bit time and that at times other than $P_o$ bit time, the contents of the accumulator is added.

The state of flip-flop 20 which contains the multiplier bit, either "0" or "1," controls the addend input to adder 22. The output of this flip-flop is applied to one input of each of the NAND-circuits 64 and 66. The other two inputs of NAND-circuit 64 receive the signal AW and the true output of flip-flop 13, respectively. The other two inputs to NAND-circuit 66 receive signals LW AND $\overline{F/F_{13}}$, respectively. The outputs of these NAND circuits form the respective inputs to a NAND-circuit 68, the output of which is applied to the addend input of adder 22. The Boolean expression for the addend input is $F/F_{20}$ $(AW\ F/F_{13}+LW\ \overline{F/F_{13}}$ indicating that during additional word times, if the multiplier bit in flip-flop 20 is a "1," the contents of register 12 is added and that during last word time, if the multiplier bit in flip-flop 20 is a "1," the complement of register 12 is added or, in other words, the multiplicand is subtracted. It can be shown that this subtraction is required during last word time if the multiplier is negative, indicated by a "1" bit in the most significant bit position of the multiplier.

Figure 3:
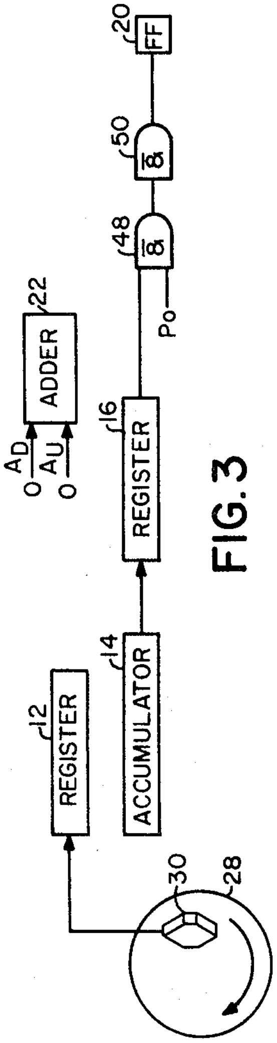
Figure 4:
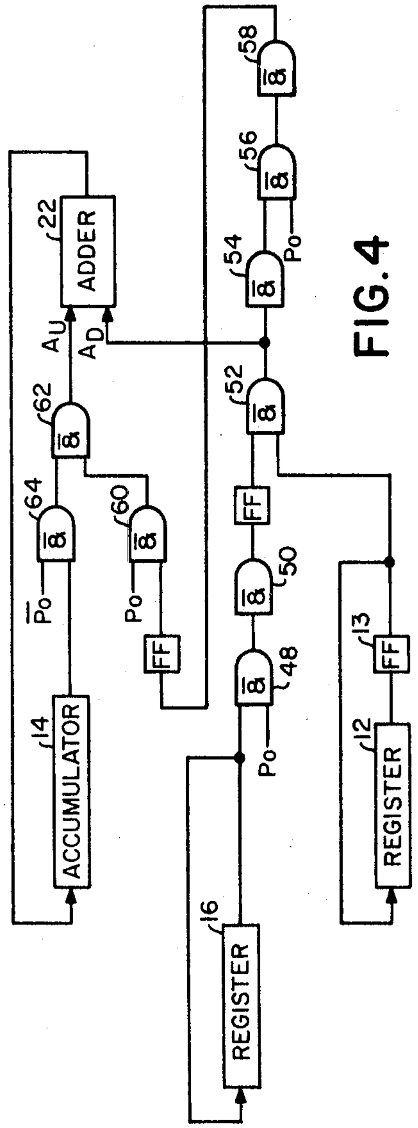
Figure 5:
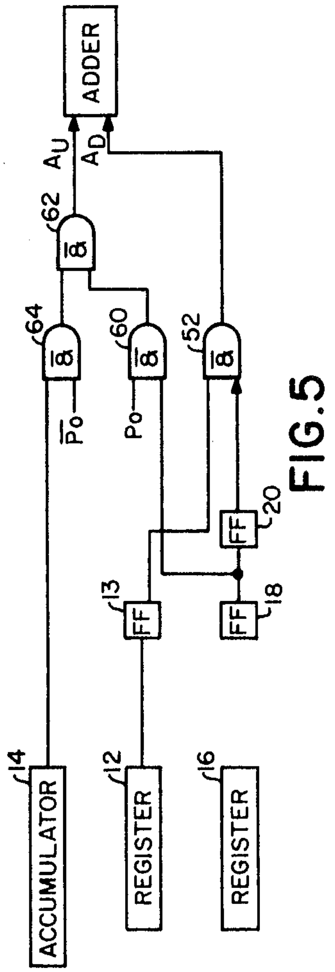

For a more complete understanding of the manner in which the conversion of a binary-coded decimal number to a binary number is carried out, reference is made to FIGS. 3, 4 and 5 of the drawings. In these three figures of drawings, the essential components of the circuit, as shown in FIG. 1, are reproduced;

however, circuit components not assuming any essential role in the respective operations are omitted. Thus, as shown in FIG. 3, during the first word of operation of a conversion, the contents of the accumulator 14 is transferred into the shift register 16 and the contents are shifted right one-bit position, whereby the least significant bit is placed into the flip-flop circuit 20. Simultaneously, the first constant is read by the head 30 from the memory disc 28 and placed into the register 12. In the first word of operation, the adder 22 plays no part and, thus, does not receive inputs to either addend or augend inputs thereof. The condition of the flip-flop circuits $BD_1$ and $BD_2$ is such so that the gating facilitates the transfers just described.

As illustrated in FIG. 4 of the drawings, during the additional word times of the conversion procedure, the contents of the register 12 is recirculated and is also added to the contents of accumulator register 14. The result is placed back into the accumulator register 14. The augend input to the adder, to accomplish this addition is under control of a signal $P_o$ controlling the presentation of the accumulator register bits to the augend input. The state of flip-flop circuit 20 controls the addition of the contents of register 12 to the addend input to the adder. As explained hereinabove, the flip-flop 18, under the circumstances, contains the sign bit and at time $P_o$ the sign of the multiplier contained in flip-flop 18 is added to the augend input to the adder and placed in the sign bit position in the accumulator register.

It is to be noted that in the present circumstances wherein the registers 12, 14 and 16 are approximately the same bit content and wherein the constants and the binary coded decimal number to be converted occupy all of the bit spaces of the registers, the accumulator register 14 will overflow inasmuch as the number of digits in a product of two numbers of equal digit places is twice that of one of the numbers. In this circumstance, approximately one-half of the lowest order digits will overflow and be lost, however, being of lesser significance.

The condition of the arithmetic circuitry during the last word of a conversion operation is as shown in FIG. 5 of the drawings, wherein the constant contained in register 12 is subtracted rather than added as a partial product under the control of the state of the flip-flop 20. In this case, the subtraction is performed by complementing the contents of the register 12 which may be accomplished by applying the false output of flip-flop 13 to the input to NAND-circuit 66 and, in which case, the other components perform in a manner explained hereinabove.

To summarize, the conversion process of the present invention is based essentially upon the multiplication function of the computer. That is, in the present computer, multiplication consists of repeated additions of the multiplicand to the shifted partial product under control of the multiplier bits beginning with the least significant multiplier bit. One such addition takes place if required during each of the 31-word times in the AW phase. If the multiplier is negative correction for this is made during the LW phase. During the operation, register 14 holds the partial products, register 16 holds the multiplier and register 12 holds the multiplicand.

During the first word time, no actual computation takes place; this word time is used to load the arithmetic registers. The multiplier originally in register 14 is transferred to register 16 wherein the least significant multiplier bit is right shifted into flip-flop 20. This bit will be used to control the addition of the multiplicand to the partial product. Also during FW time, register 14 is cleared out to prepare it for holding the partial products and the multiplicand from memory is loaded into the register 12.

During each word time in the AW phase successive partial products are formed by shifting the previous partial product right one-bit position and if the current multiplier bit is "1," adding the multiplicand to it. As mentioned, the multiplier bit which controls addition is in flip-flop 20. Thus, if this flip-flop is set, the multiplicand from register 12 is read into the adder through the $A_D$ logic, otherwise $A_D$ is "0." The shifted partial product is obtained by reading the contents of the register 14 into the adder through $A_U$ and then recirculating the result back into the "A" register 14.

Concurrently with the formation of the partial products, the multiplier which is in register 16 shifts right one-bit position during each word time of AW. Thus, at $P_o$, the time which indicates the ending of each word time during AW, the bit shifted out of register 16 is loaded into flip-flop 20 to control the addition of the multiplicand to the partial product during the following word time. This process is repeated until all the multiplier bits are processed. At the conclusion of the multiply operation, the product remains in register 14.

The decimal-to-binary conversion operation of the present invention is substantially identical to the MULTIPLY operation described above except that a new multiplicand (a constant, $K_i$) is used for each B.C.D. character.

Thus, to carry out the novel method of the present invention, new values of the multiplicand ($K_1$, $K_2$,...$K_i$) must be obtained from memory every four-word times beginning with F.W. The constant $K_1$ (multiplicand) is loaded into register 12 during FW and thereafter the four-state counter consisting of flip-flops $BD_1$ and $BD_2$ controls accessing of new constants. That is, the counter is reset to its 00 state and then incremented every $P_o$ (once every word time) until it goes through its serial states 00, 01, 11, 10, etc., Each time the counter is reset to the 00 state a new constant is loaded into the register 12. Since the counter is reset to 00 during FW and then incremented every $P_o$ thereafter (including $P_o$ at the end of FW), new constants are accessed and loaded into register 12 during the third, seventh, etc., AW word times. In addition, whenever the counter $BD_1$–$BD_2$ is in its 00 state, the output of register 12, namely the "old" constant, is added to the existing partial product in register 14 at the same time that the "new " constant is being loaded into register 12.

While the present invention has been described in a preferred embodiment, it will be obvious to those skilled in the art that various modifications can be made therein within the scope of the invention, and it is intended that the appended claims cover all such modifications.

What is claimed is:

1. An apparatus for converting fractional binary-coded decimal numbers to equivalent binary numbers comprising register means for storing a binary-coded decimal number, memory storage means for storing a plurality of constants in pure binary form, said constants forming a geometric progression wherein each succeeding constant after the first is ten-sixteenths times the last-preceeding constant, means for successively performing four steps of multiplication with each succeeding constant as a multiplicand and the respective bits of each succeeding digit of said binary-coded decimal number as the corresponding multiplier, accumulator storage means and means for adding the partial products so produced to the contents of said accumulator storage means and for shifting the contents of said accumulator right after each addition a memory routing gate with first and second inputs, a register-recirculating gate, first and second flip-flops interconnected to form a four-step binary counter having first and second outputs, a first NAND circuit having first and second inputs respectively connected to said first and second outputs of said binary counter, said first NAND circuit having a third input for accepting a continuous control signal during said conversion mode, and having a first output, and a second NAND circuit having a first input connected to said first output of said first NAND circuit, said second NAND circuit having a second input for accepting a signal for initiating a first operation in said conversion mode, said second NAND circuit having an output connected to said first input of said memory routing gate.

2. The adapter as claimed in claim 1, wherein said register-recirculating gate has a first input, and said output of said first NAND circuit is connected to said first input of said register-recirculating gate.

3. The adapter as claimed in claim 7, including a memory storage means, said memory storage means including a plurality of memory locations, each said location containing a conversion constant, and said memory storage means further including memory detection means for detecting said conversion constants, said memory detection means being connected to said second input of said memory routing gate.

4. An apparatus for converting fractional binary-coded decimal numbers to equivalent binary numbers comprising first shift register means for storing a binary-coded decimal number, memory means for storing a plurality of fractional constants, a four-step counter, a second shift register and gating means responsive to said counter for transferring a different one of said constants from said memory means to said second shift register means each four steps of said counter, binary storage means responsive to different binary signals to assume different binary conditions and further gating means for progressively shifting the bits of said binary-coded decimal number into said binary storage means to cause the same to assume a corresponding binary condition, an accumulator register, adder means and additional gating means responsive to one condition of said binary storage means for adding the constant in said second shift register to the contents of said accumulator register, and to the other condition of said binary storage means to add zero to the contents of said accumulator, means for shifting right the contents of said first register and said accumulator register after each addition whereby the four bits of each binary-coded decimal digit are used as multiplier bits for only one of said constants and the result of each multiplication forms a partial product added to the contents of the accumulator register to form a binary number equivalent to said binary-coded decimal number, a memory-routing gate with first and second inputs, a register-recirculating gate, first and second flip-flops interconnected to form said four-step binary counter having first and second outputs, a first NAND circuit having first and second inputs respectively connected to said first and second outputs of said binary counter, said first NAND circuit having a third input for accepting a continuous control signal during said conversion mode, and having a first output, and a second NAND circuit having a first input connected to said first output of said first NAND circuit, said second NAND circuit having a second input for accepting a signal for initiating a first operation in said conversion mode, said second NAND circuit having an output connected to said first input of said memory-routing gate.

5. An apparatus for converting a fractional binary-coded decimal number to an equivalent binary number comprising register means for storing said binary-coded decimal number, adder means and accumulator register means, means for storing a plurality of constants, means for successively sensing each bit of said binary-coded decimal number and for successively adding the value of each constant to the contents of said accumulator in response to a "1" bit in the corresponding bit positions of each succeeding binary-coded decimal digit stored in said register means, means for shifting right the contents of said accumulator after each of said binary-coded decimal bits has been sensed, and means for selecting a different constant from said storing means after every fourth bit in said binary-coded decimal number has been sensed, a memory-routing gate with first and second inputs, a register-recirculating gate, first and second flip-flops interconnected to form a four-step binary counter having first and second outputs, first NAND circuit having first and second inputs respectively connected to said first and second outputs of said binary counter, said first NAND circuit having a third input for accepting a continuous control signal during said conversion mode, and having a first output, and a second NAND circuit having a first input connected to said first output of said first NAND circuit, said second NAND circuit having a second input for accepting a signal for initiating a first operation in said conversion mode, said second NAND circuit having an output connected to said first input of said memory-routing gate.

* * * * *